(12) United States Patent
Rauch

(10) Patent No.: US 8,420,008 B2
(45) Date of Patent: Apr. 16, 2013

(54) SIDE WELL FOR METAL MELTING FURNACE

(75) Inventor: Edwin L. Rauch, Fulton, NY (US)

(73) Assignee: Novelis Inc., Toronto, Ontario (CA)

(*) Notice: Subject to any disclaimer, the term of this patent is extended or adjusted under 35 U.S.C. 154(b) by 182 days.

(21) Appl. No.: 12/924,580

(22) Filed: Sep. 29, 2010

(65) Prior Publication Data

US 2011/0074072 A1    Mar. 31, 2011

Related U.S. Application Data

(60) Provisional application No. 61/277,805, filed on Sep. 30, 2009.

(51) Int. Cl.
*F27B 17/00* (2006.01)
*F27D 99/00* (2010.01)

(52) U.S. Cl.
USPC .............................. 266/216; 266/233; 266/235

(58) Field of Classification Search .................. 266/235, 266/233, 216
See application file for complete search history.

(56) References Cited

U.S. PATENT DOCUMENTS

| | | | |
|---|---|---|---|
| 4,286,985 A | 9/1981 | van Linden et al. | |
| 4,884,786 A | 12/1989 | Gillespie | |
| 4,940,214 A | 7/1990 | Gillespie | |
| 5,984,999 A | 11/1999 | Areaux | |
| 6,074,455 A | 6/2000 | van Linden et al. | |
| 7,497,988 B2 * | 3/2009 | Thut | 266/235 |
| 2007/0108674 A1 | 5/2007 | Yu et al. | |
| 2008/0023891 A1 | 1/2008 | Peel et al. | |
| 2010/0244338 A1 | 9/2010 | Takahashi | |
| 2011/0074072 A1 * | 3/2011 | Rauch | 266/166 |

FOREIGN PATENT DOCUMENTS

| | | |
|---|---|---|
| JP | 05255770 A | 10/1993 |
| JP | 2006-177612 A | 7/2006 |

OTHER PUBLICATIONS

Canadian Intellectual Property Office, International Search Report, Jan. 10, 2011, PCT/CA2010/001542 (Novelis Inc., et al.).

* cited by examiner

*Primary Examiner* — Scott Kastler
(74) *Attorney, Agent, or Firm* — Cooper & Dunham LLP (57) ABSTRACT

An exemplary embodiment of the invention provides a side well for a metal melting furnace. The side well comprises an insulated body having a front wall adapted to form part of an insulated side wall of a metal melting furnace and a top, a cavity within the body including a single upright well having a cylindrical wall adjacent to a closed bottom of the cavity, an entrance to the cavity at the top of the insulated body, a metal inlet channel leading directly into the cavity from an inlet aperture in the front wall, and a metal outlet channel leading directly from the cavity to a metal outlet aperture in the front wall. The side well includes a rotatable impeller having a vertical rotatable shaft and at least one vaned section positioned at a lower end of the rotatable shaft; wherein the impeller extends into the cavity with the vaned section positioned in the well adjacent to the cylindrical wall.

20 Claims, 9 Drawing Sheets

SIDE WELL FOR METAL MELTING FURNACE

CROSS-REFERENCE TO RELATED APPLICATIONS

This application claims the priority right of U.S. provisional patent application Ser. No. 61/277,805 filed Sep. 30, 2009 by applicants named herein. The disclosure of U.S. Ser. No. 61/277,805 is specifically disclosed herein by this reference.

BACKGROUND OF THE INVENTION (1) Field of the Invention

This invention relates to a side well for a metal melting furnace. More particularly, the invention relates to a side well that may be used as a metal melter and/or a metal agitator or metal stirring pump.

(2) Description of the Related Art

Metals are frequently melted in metal melting furnaces. For example, relatively clean aluminum and copper scrap materials, as well as pure metals, are usually melted in reverberatory furnaces for eventual use or re-use by metal fabricators. A direct charge reverberatory furnace (DCF) heats the furnace contents both by direct flame and by radiation from hot refractory linings and possibly from additional heating elements. At its simplest, such a furnace is a steel box lined with alumina or other refractory brick having a flue at one end and a generally vertically lifting door at the other end closing a main entrance for the furnace through which a metal is directly charged into the furnace. The charge of molten metal may be introduced through the main entrance and lies in a shallow hearth having a relatively low roof so that flame passes across the surface of the charge. Conventional oil or gas burners are usually placed on either side of the furnace to heat the refractory lining and to melt the metal. The resulting molten metal is then poured into a casting machine to produce metal ingot.

A static furnace may be tapped at the bottom by simply removing a ceramic-covered plug which then allows the molten aluminum to flow into a launder and from there to the casting machine. Direct charge furnaces tend to be fully drained on a periodic basis, although restarting such furnaces after they have been fully drained can lead to problems from residual metal that has solidified in areas that cooled too quickly. Therefore, such furnaces are not normally provided with auxiliary equipment, such as side wells, where metal may linger and solidify during draining. When agitation of the metal in the furnace is required, it is often done by electromagnetic stirring devices that are positioned on the outside of the furnace wall without direct metal contact. Such furnaces are generally unsuitable for melting light gauge metal (e.g. metal foil) or finely divided metal (metal powders) because the large surface area of the metal allows a substantial amount of oxidation to take place before the metal is fully melted in the main furnace chamber. There can therefore be significant metal loss.

In contrast, recycle reverberatory furnaces (RF) are used more frequently for contaminated scrap, e.g. scrap metal coated with organic materials, and are provided with one or more side wells where the coated scrap is mixed with a flux that enables contaminants to be skimmed off as a floating dross before the molten metal enters the main chamber of the furnace from the side well. Such furnaces may also be used for melting light gauge metal scrap, shredded scrap and metal powders because the flux can isolate the metal from an oxidizing atmosphere as the metal is melted. Furnaces of this kind tend to operate continuously and are never completely drained, so there are no problems of furnace start-up, even though the side wells may provide areas where molten metal may linger. However, the side wells are relatively large structures that must provide settling space and areas for the addition of flux, therefore increasing capital costs and the need for substantial amounts of floor space.

Although, as stated, direct charge furnaces are not generally provided with side wells, an electromagnetic pumping system is known for such furnaces that employs a linear motor to withdraw molten metal from a furnace through a channel to a separate chamber or charge well and then return it through a further channel to the furnace. However, electromagnetic pumping systems are expensive and can be bulky and complex. Also, they may not avoid the problem of metal solidification during furnace draining.

U.S. patent application publication no. US 2007/0108674 A1, published on May 17, 2007, to Yu et al. discloses a scrap melter for light gauge scrap having a shrouded impeller which is immersed in a molten metal pool in a charge bay or furnace. It is inclined at an angle relative to the vertical to create a vortex forming a whirlpool at the surface of the molten metal. The center of the whirlpool is horizontally displaced from the so that scrap can be charged into the whirlpool to be ingested into the vortex.

U.S. Pat. No. 6,074,455 issued on Jun. 13, 2000 to van Linden et al. discloses a method of melting floatable scrap in which molten metal is fed through two melting bays, a first one of which is provided with a rotatable impeller. The molten metal is introduced into the first melting bay from below and is rotated to form a vortex.

U.S. Pat. No. 4,940,214 issued on Jul. 10, 1990 to Gillespie discloses a furnace having a charging well for the introduction of light weight solid scrap. A vortex generator including an impeller imparts a vortex to the melt in the well. An elevating mechanism makes it possible to elevate and remove the impeller.

U.S. Pat. No. 4,286,985 issued on Sep. 1, 1981 to van Linden et al. provides a receptacle supplied with molten metal that creates a free vortex. A pump is used to supply the molten metal to the receptacle. Metal scrap may be introduced into the receptacle so that it is ingested by the vortex.

BRIEF SUMMARY OF THE INVENTION

An exemplary embodiment of the invention provides a side well for a metal melting furnace. The side well comprises an insulated body having a front wall adapted to form part of an insulated side wall of a metal melting furnace and a top, a cavity within the body including a single upright well having a cylindrical wall adjacent to a closed bottom of the cavity, an entrance to the cavity at the top of the insulated body, a metal inlet channel leading directly into the cavity from an inlet aperture in the front wall, and a metal outlet channel leading directly from the cavity to a metal outlet aperture in the front wall. The side well includes a rotatable impeller having a vertical rotatable shaft and at least one vaned section positioned at a lower end of the rotatable shaft; wherein the impeller extends into the cavity with the vaned section positioned in the well adjacent to the cylindrical wall.

The body preferably comprises a monolithic block of refractory ceramic material containing the cavity and the channels and front wall. The unification of these elements into a single block design allows the resulting side well to be very compact in terms of the floor area that it occupies.

Another exemplary embodiment provides an insulated body for a side well for a metal melting furnace. The insulated body has a front wall adapted to form part of an insulated side wall of the metal melting furnace and a top, a cavity within the body having a cylindrical wall adjacent to a closed bottom of the cavity for receiving a vaned section of an impeller, an entrance to the cavity at the top of said insulated body, a metal inlet channel leading directly into the cavity from an inlet aperture in the front wall, and a metal outlet channel leading directly from the cavity to a metal outlet aperture in the front wall.

Another exemplary embodiment relates to a metal melting furnace provided with a side well as described above. The melting furnace is preferably a direct charge reverberatory metal melting furnace, but may be of another kind, e.g. a recycle reverberatory furnace or open well furnace where the sidewell above may be used as pumping and shred melting device communicating with the main furnace chamber.

The molten metal inlet and molten metal outlet each have a cross-sectional area. The ratios of the cross-sectional areas of the metal inlet to the metal outlet is preferably from 1:1 to 10:1, and more preferably from 2:1 to 3:1. Such ratios minimize the head loss for the metal entering the well so that the metal head (depth) over the impeller is maximized. This allows the impeller to be run at a higher speed with a desired vortex and thereby maximizes the pumping action of the impeller.

The bottom of the metal inlet is preferably positioned high enough above the furnace floor to prevent debris from being pulled in (which could damage the impeller). This height is preferably from 4 to 6 inches from the furnace floor, but could be much higher than this if the depth of metal in the furnace permits a higher placement (clearly, the metal inlet should preferably be below the surface of the metal in the furnace, and sufficiently far below the surface to avoid ingress of gases). Expressed as a function of the height of the pool of metal in the furnace, the bottom of the metal inlet is preferably situated between 5 and 90% of the pool height. In embodiments where the bottom of the cavity is above the level of the furnace floor, the bottom of the inlet is most preferably situated between 10 and 20% of the pool height. For embodiments where the bottom of the cavity is positioned below the level of the furnace floor, the bottom of the inlet is most preferably situated from 5 to 10% of the pool height.

The side well makes it possible to carry out metal stirring and metal pumping while permitting sampling and alloying, as well as melting of light gauge, granular or powder metal in a batch for transfer to a main furnace chamber of, for example, a reverberatory furnace. The temperature of the molten metal can also be measured accurately in the side well due to the thorough mixing of the metal taking place therein.

The side well may be detachable from the furnace or built as a permanent part thereof. If the side well is detachable, it is preferably flange-mounted and it may be supported on wheels or rollers, or may be provided with anchor points for the attachment of cables from a moving crane or the like. The furnace is then provided with slots for metal movement into and out of the side well and provided with semi-permanent metal resistant refractory plugs to close the openings when the side well is removed. The main furnace chamber dense refractory is made thick enough in this region to be flush with the mating flange on the furnace case. Alternatively, the furnace may be provided with a full side opening the size of the mating flange of the side well. A closure unit is then provided having the full depth furnace wall and the removable side well includes the respective section of the furnace wall.

As stated, the channels and cavity of the side well are preferably formed in a monolithic block of refractory, molten metal resistant material. Suitable materials for use with molten aluminum include, for example, high alumina- or mullite-based refractories that may include additives such as BaO or BaS. A suitable commercial material is sold as Ultra-Express™ 70AI by Harbison Walker of Pittsburgh, Pa., U.S.A. Another suitable commercial material is a plastic refractory also sold by Harbison Walker under the designation 85P, which contains phosphoric acid as a chemical bonding agent. Further alternatives include silicon carbide-based materials, such as Cast Refrax™ sold by Saint-Gobain Industrial Ceramics of St. Helens, Merseyside, United Kingdom, or metal fiber/ceramic composites, such as SIFCA sold by Wahl Refractories of Fremont, Ohio, U.S.A. All of these materials have quite high heat conductivity, so in order to minimize shell temperatures, the external surfaces may be covered with an insulating material such as mineral wool block or calcium silicate block. The entire structure may then be covered with a metal shell to provide resistance to damage and abrasion. If a material other than a ceramic is desired for the main body of the side well, a metal may be used, but must be resistant to the temperatures employed and attack by the molten metal from the furnace. Titanium is suitable for use with molten aluminum, especially when coated in the contact areas with a refractory, such as BN. A further alternative for the material of the body is graphite, but can only be used if the temperatures are kept below about 800° C. unless the surface are protected from attack by oxygen by an overlying layer of protective gas or molten metal.

The main body of the side well may be cast from a slurry or pressed/rammed as a single piece, followed by firing, or it may be built up of numerous pieces of refractory that fit together to form the desired shape. For casting, the channels and cavity may be shaped by forms made of wood, plastics foam, etc., that can be removed before firing. An alternative if the side well is to be lined in place on a furnace is to use forms made of the metal to be melted (e.g. aluminum). The forms are then melted out during casting. This method is particularly useful if plastic refractory such as Harbison Walker™ 85P is used to form a metal containment liner, since this material does not become fully rigid until it is heated over 600° C. and will deform if not supported up to 600° C.

BRIEF DESCRIPTION OF THE SEVERAL
VIEWS OF THE DRAWINGS

Exemplary embodiments of the invention are described in detail in the following with reference to the accompanying drawings, in which.

DETAILED DESCRIPTION OF THE EXEMPLARY EMBODIMENTS

A first exemplary embodiment of a body for a side well according to the invention is shown in FIGS. 1 to 6. The body 12 has a front wall 14, a rearwardly-tapering curved side wall 15 and a top 16. The front wall 14 is part of a refractory ceramic block 17 (e.g. of alumina or other refractory material) shaped and dimensioned to fit within a corresponding opening in a circular refractory-lined side wall 18 (shown only in part in broken lines in FIG. 2) of a direct charge reverberatory metal melting furnace 20. A front surface 21 of the front wall 14 comes into direct contact with molten metal within the main chamber of the furnace. The body 12 has an upright cavity 22 extending upwardly to a circular opening 23 at the top 16 of the body. The cavity is closed at its bottom end and terminates in an impeller region 25 having an upright cylindrical wall 26 (see FIG. 6). The walls 27 of the cavity 22 above the impeller region 25 are also preferably cylindrical with a diameter similar (or identical) to that of the impeller region 25 itself, but may be of another shape, e.g. rectangular or square, if desired. Thus, the impeller region 25 is just the lower end of the cavity 22, but it provides upright cylindrical walls over a distance corresponding to a vaned section of an impeller (described later).

The front surface 21 of the body has two spaced apertures 28 and 29 for molten metal. The higher and larger aperture 28 is an inlet for molten metal into the body 12 and the lower aperture 29 is an outlet for molten metal from the body to the furnace chamber. As can be seen from FIG. 3, the lower aperture 29 (metal outlet) is positioned a small distance above the level 23 of the bottom of the furnace chamber and the upper opening 28 is positioned below the normal surface position of the molten metal in the furnace chamber, which can vary in height from a lower level 31 to a higher level 32 as shown by arrow 33. As can be seen from FIGS. 4 and 5, the apertures 28 and 29 are connected by short channels 31 and 32 to the cavity 22. The channel 31, which is connected to the inlet aperture 28, is wider (of greater cross-sectional area) than the channel 32 connected to the outlet aperture 29.

Figure 1:
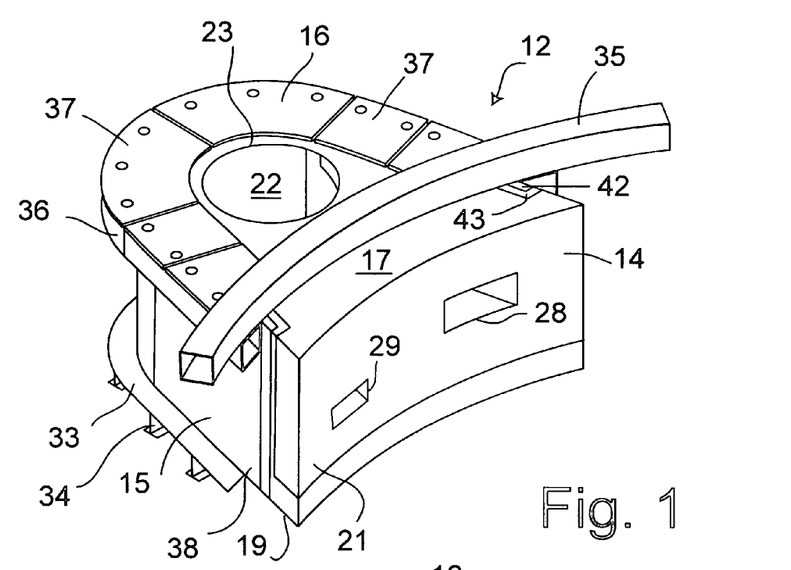
FIG. 1 is a perspective view of a side well body for a side well according to one exemplary embodiment of the invention.
Figure 2:
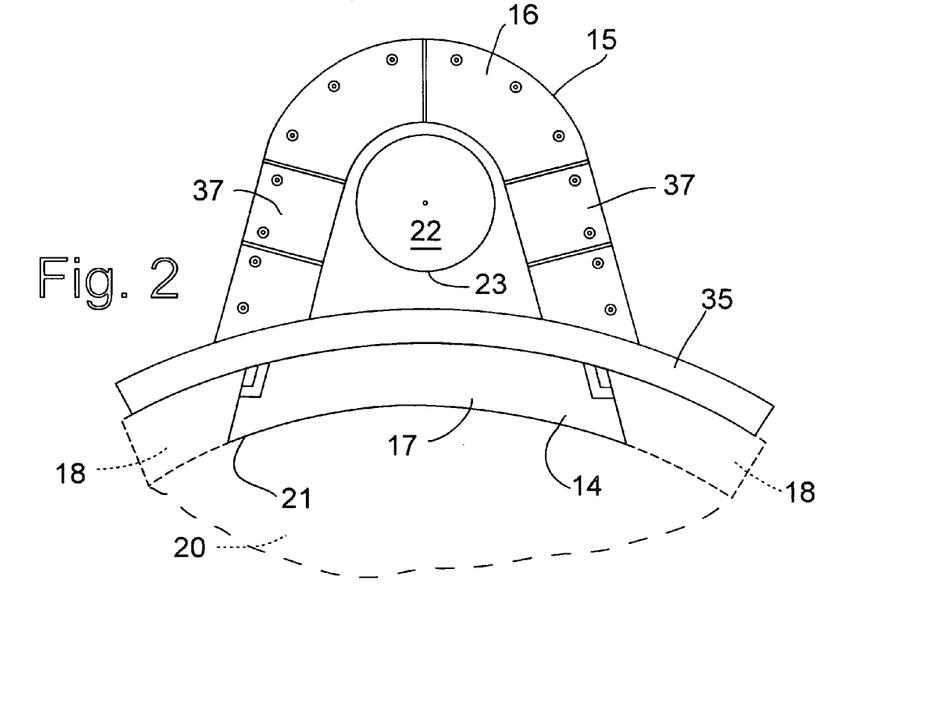
FIG. 2 is a top plan view of the side well body of FIG. 1.
Figure 3:
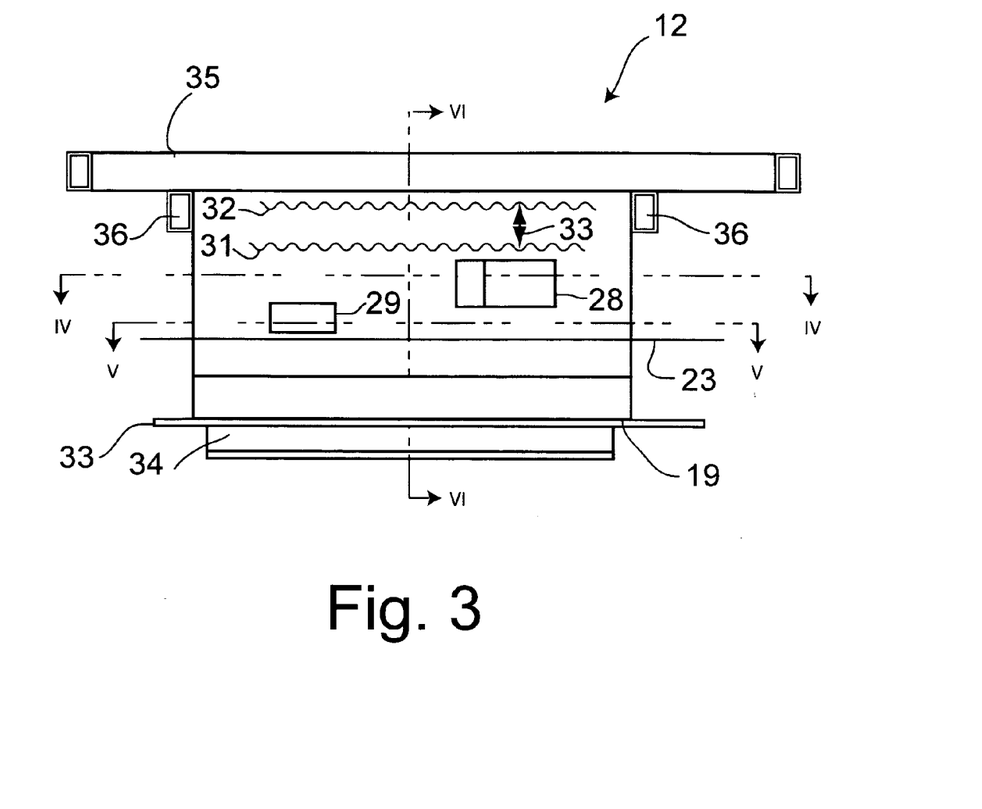
FIG. 3 is front elevation of the side well body of FIG. 1.
Figure 4:
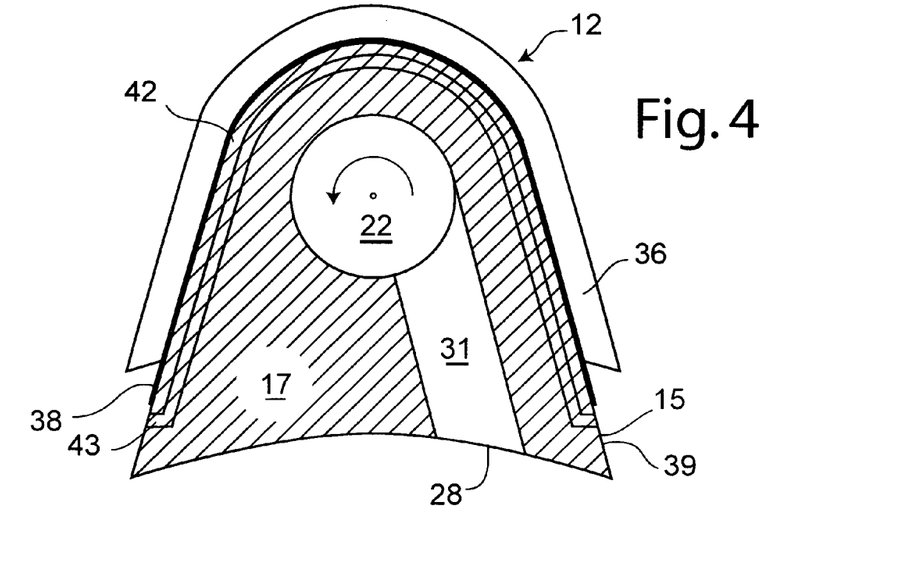
FIG. 4 is a horizontal cross-section of the side well body taken on the line IV-IV of FIG. 3.
Figure 5:
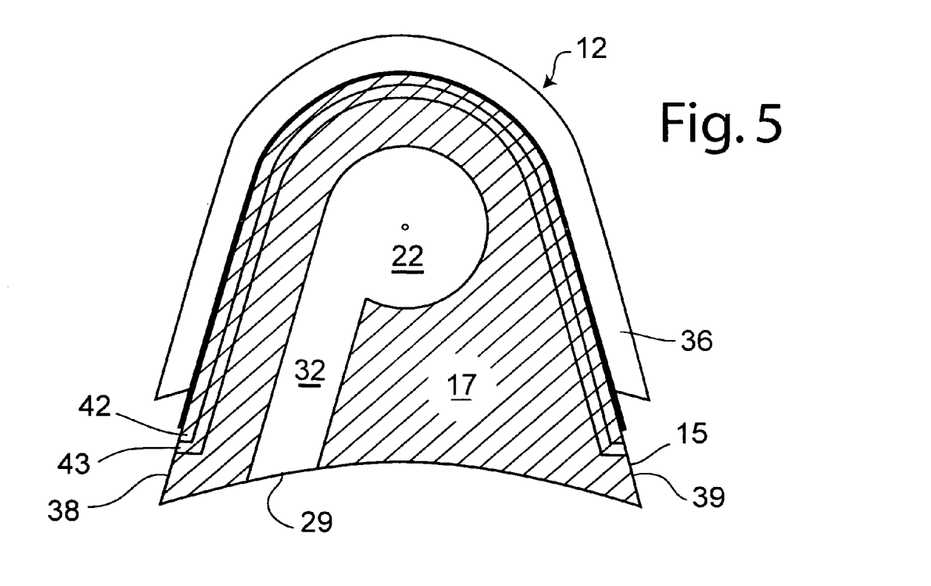
FIG. 5 is a horizontal cross-section of the side well body taken on the line V-V of FIG. 3.

The channels 31 and 32 are arranged at an angle to each other as shown. The metal flowing out of aperture 29 entrains metal from the furnace chamber into which it discharges to create a cone (not shown) with a 22.5° total included angle until the cone intersects the floor of the chamber and the surface of the metal bath. Consequently, channels 31 and 32 are preferably angled away from each other by at least 22.5° to ensure that the metal outflow from aperture 29 remains separate from the metal inflow into aperture 28 to avoid contamination.

Although the metal channels 31 and 32 are rectangular in the illustrated embodiment, such channels may be made to have any suitable cross-sectional shape, e.g. circular or oval, if desired. However, rectangular channels are generally easier to manufacture.

The channels 31 and 32 are preferably made as short as possible to minimize metal cooling and to avoid the possibility that metal may freeze in the channels and cause blockages when the furnace has to be drained and recharged with solid metal. As the metal melts during recharging of the furnace, very little superheat is imparted to the metal initially, and the metal may freeze in the channels if they are made too long. For reliable operation, the channels are preferably each made less than about 48 inches (122 cm) in length for batch type operations. However, if the furnace is rarely drained, a maximum length for each channel of about 120 inches (305 cm), and more preferably 96 inches (244 cm), would assure reliable operation.

The top 16 of the body 12 is provided with a guard rail 35 which limits the depth of penetration of the front wall 14 of the body into the furnace chamber and also seals the upper edge of the body against loss of gases from the furnace interior. A curved rail 36 is provided at the upper end of the encircling side wall 15 to provide anchorage for metal plates 37 that provide the upper surface with protection against impacts and abrasions. At a lower end 19 of the body, the body rests on a metal platform 33 provided with supports 34 that raise the body to the correct height for insertion into the opening in the wall of the furnace. As can be seen most clearly from FIGS. 4 and 5, the side wall 15 is formed by an outer metal shell 38 surrounding an exterior 39 of block 17 made of refractory ceramic material which extends to and surrounds the cavity 22. Layers 42 and 43 of the body are made of different types of refractory material from the remainder to provide improved heat insulation and resistance to damage to the body 12, e.g. due to thermal expansion of the interior parts of the body 12. For example, layer 42 may be a heat insulator and layer 43 may be made of a compressible material of intermediate density and heat conductivity, such as Versaflow™ 45 AL Adtech sold by Harbison Walker, to create a crush zone to absorb thermal expansion of the dense refractory of the interior. This layer may also serve as a secondary metal containment barrier (in case of cracking of the main refractory) and to reduce the temperature experienced by the outer insulating layer 42.

Figure 6:
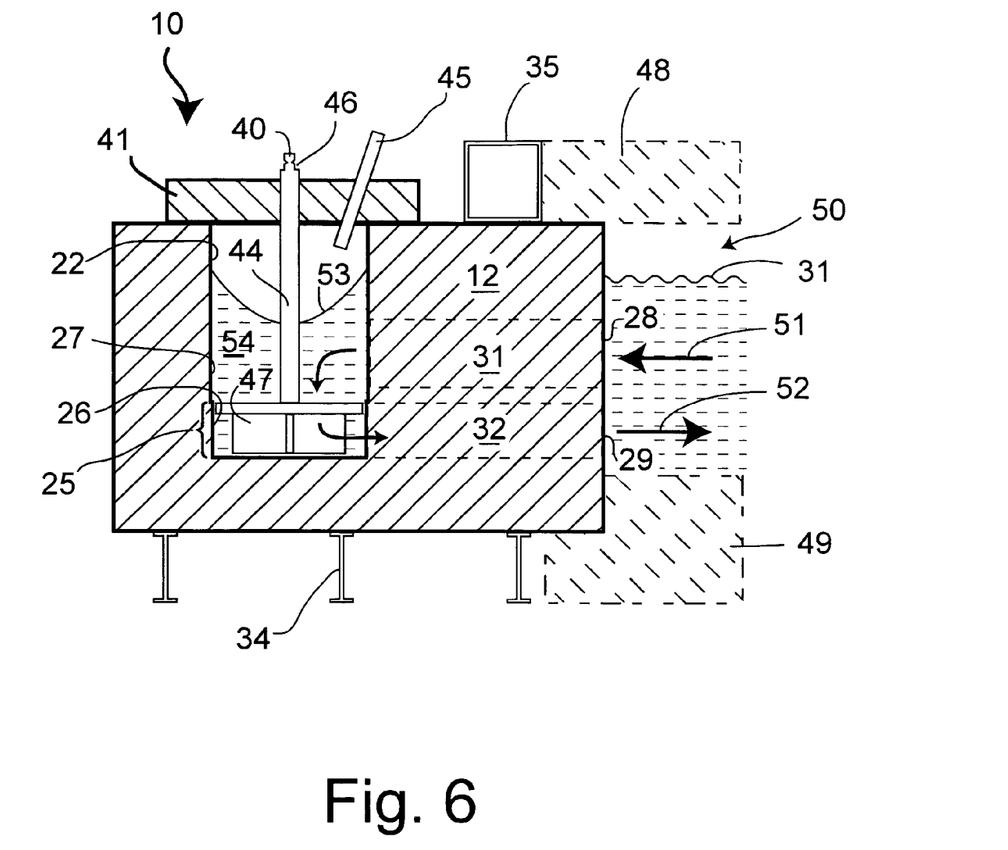
FIG. 6 is a vertical cross-section of a side well taken on the line VI-Vi of FIG. 3 including the side well body of FIG. 1 and additional equipment, including an impeller.
Figures 7, 8:
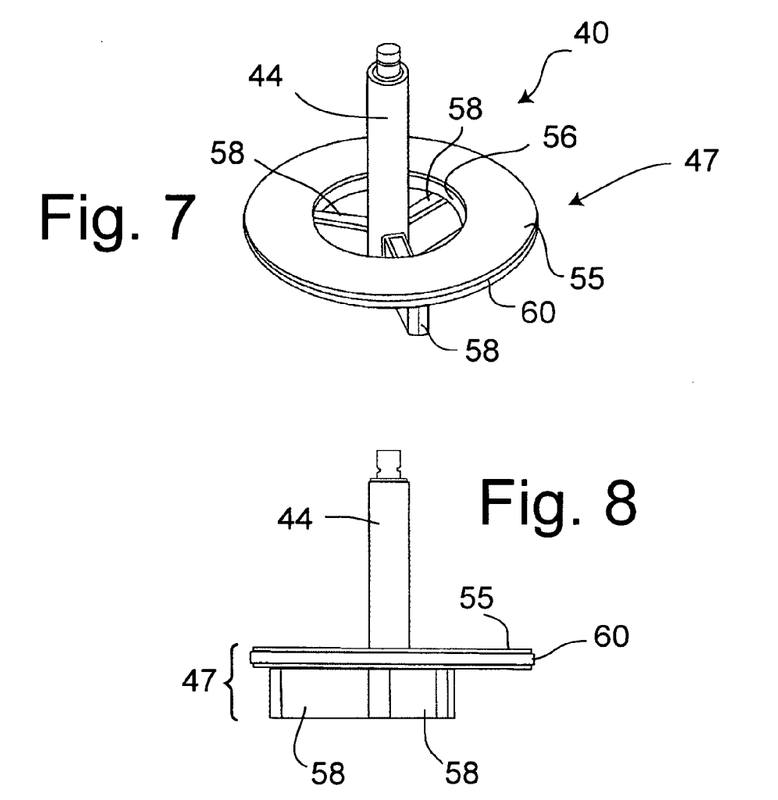
FIGS. 7 through 10 are perspective, elevation, underneath plan and top plan views, respectively, of the impeller of FIG. 6 shown in isolation.
Figure 9:
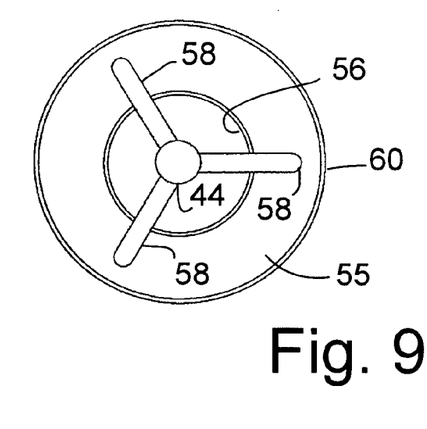
Figure 10:
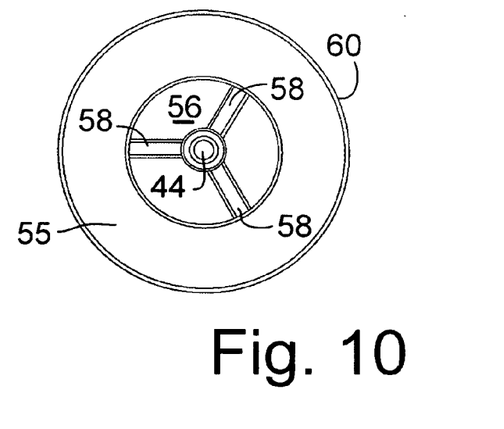

FIG. 6 shows a central vertical cross-section of the body 12 fitted with an impeller 40 and a cover 41 that, for reasons of simplicity, are not shown in the earlier drawings. Together, the body 12 and impeller 40 make up a side well 10 according to this exemplary embodiment. The provision of a cover 41 is optional; however, it reduces heat loss from the cavity 22 and prevents the cavity 22 from acting undesirably as a secondary flue or cold air intake point for the main furnace chamber when the latter is being drained. The cover 41 is provided with a burner 45 (e.g. a natural gas burner or propane burner) for directing heat and flame into the interior of the cavity 22. A burner of this kind is optional in this particular exemplary embodiment, but it is desirable because it makes it possible to provide further heat to a charge of metal introduced into the cavity 22 to accelerate its melting. Additionally, the use of burner may help to melt the build-up of metal that can take place at the bath surface of the furnace chamber. FIG. 6 also partially illustrates a roof 48 and floor 49 of a furnace chamber 50 and the normal surface position 31 of molten metal contained within the furnace.

The impeller 40 has a vertical shaft 44 extending through the cover 41 and an upper end 46 that is shaped to accommodate a drive mechanism (see FIG. 12 described later) connected to an external electrical motor that causes the shaft to rotate about a vertical axis. The lower end of the impeller has a vaned section 47 that fits closely within the region 25 at the lower end of the cavity 22. The clearance between the outer periphery of the vaned section and the cylindrical wall 26 of the impeller region 25 is very small, preferably in the range of 0.1 to 10% of the outer diameter of the vaned section 47, and more preferably 1.5 to 4%. This ensures that the impeller drives the molten metal with little loss of flow efficiency, and it is found that an impeller positioned in this way is capable of moving 20 to 40 metric tonnes of molten metal per minute. When the gap is above 10%, the impeller still functions but local recirculation starts to increase and thereby starts to decrease the efficiency of the intended metal flow.

The impeller 40 draws molten metal into the inlet aperture 28, as shown by arrow 51 of FIG. 6, along the channel 31, into the cavity 22, and then expels it from the cavity along channel 32 to exit the metal aperture 29, as shown by arrow 52, near the furnace chamber floor 49. This circulation has the effect of thoroughly mixing any non-homogeneous components of the molten metal (e.g. alloys of different composition). The impeller 40 also creates a stable vortex 53 at the surface of molten metal 54 within the cavity 22 so that scrap metal pieces, metal granules or powder (not shown) introduced into the cavity from the top, after temporarily removing the cover 41, are quickly drawn down below the metal surface so that little of the metal remains exposed to the atmosphere as it is heated to its melting temperature. There is therefore little opportunity for oxidation of the metal and therefore little metal loss. The sidewell 10 can therefore be used to melt new additions of solid metal into the cavity 22 and to introduce the resulting melted metal into the furnace chamber 50 via the outlet channel 32. To prevent the vortex 53 from becoming too deep over a range of impeller speeds, a sufficient head of metal over the vaned section 47 should be maintained, and this is assured by making the inlet channel 31 of larger cross-sectional area than that of the outlet channel 32. For safety, this depth (above the vaned section) should preferably be greater than the inside diameter of the opening in the disk (see the description below). Although the creation of the vortex 53 is advantageous and preferred, it will not be formed if the speed of rotation of the impeller 40 is reduced below a minimum threshold. Even so, metal will still be circulated from and to the furnace chamber and so the side well may be operated without a vortex, if desired, especially between metal additions.

The impeller 40 of FIG. 6 is shown in greater detail in FIGS. 7 to 10. The vaned section 47 includes a horizontal disk 55 provided with a central opening 56. The vertical rotatable shaft 44 passes through the central opening and supports three horizontal radial vanes 58 symmetrically arranged around the axis if the shaft. The vanes 58 terminate a slight distance short of the periphery 60 of the disk 55 but are attached to the disk in the regions of overlap, thereby securing the disk to the impeller. In operation, the disk 55 allows metal to be drawn from above through the opening 56 into the spaces between the vanes, but prevents any reverse flow at the outer periphery of the disk. The rotation of the vanes impels the metal to flow outwardly through the channel 32 which is vertically aligned with the vanes. Although the vanes terminate short of the periphery of the disk 55, as explained, they may in fact be extended to the periphery of the disk, if desired. However, by terminating the vanes a little short of the periphery, if there is contact between the impeller 40 and the walls 26, the contact will be with the smooth rim of the disk and thereby reduce the risk of jamming or damage to the vanes.

The short and straight channels 31 and 32 allow the molten metal to be circulated efficiently and with little physical resistance, and the design and close fitting of the vaned section 47 allows a substantial volume of molten metal to be moved through the side well quickly and with little heat loss. The overall design is compact and efficient.

Figure 11:
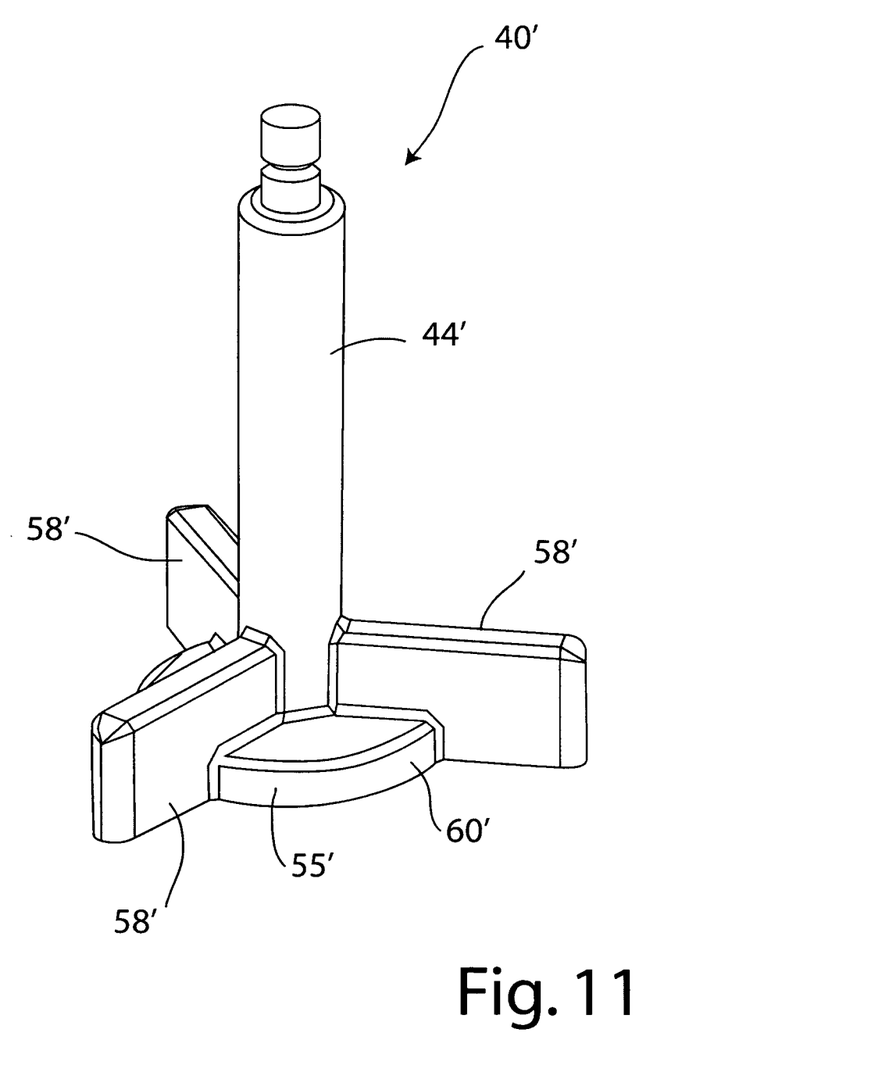
FIG. 11 shows an alternative impeller design that may be used in place of the one shown in FIGS. 7 through 10.

An alternative design of the impeller 40' is shown in FIG. 11. This consists of a vertical shaft 44' provided with three horizontal radial vanes 58' as in the previous version. In this case, however, there is a horizontal disk 55' extending from the lower end of the shaft 44' and positioned between the vanes 58'. The periphery 60' of this disk is positioned short of the ends of the vanes 58'. When this impeller is used in cavity 22, it is positioned off-center within the impeller region 25 so that the tips of the vanes come close to the wall 26 in the zone between the internal apertures of channels 31 and 32, i.e. the right hand side of cavity 22 as shown in FIG. 6. This creates a preferential flow pattern in the molten metal in the direction towards the outlet channel 32. However, the pumping efficiency may be somewhat lower than that achieved by the impeller of FIGS. 7 to 10.

Impellers of both embodiments are made of a material that is resistant to high temperature and attack by the molten metal being circulated. Examples of suitable materials for use with molten aluminum include solid graphite, and a steel or cast iron frame encapsulating a molten metal-resistant refractory material.

When the furnace is emptied of molten metal, the side well 10 is self-draining because metal within the chamber 22 drains under gravity through the short outlet channel 32 and into the furnace chamber 50. There is little likelihood that metal will remain in the side well and solidify upon cooling because the floor of outlet channel 32 is preferably at the same or similar vertical height as the floor of the cavity 22. However, if any metal does do remain in the cavity 22, it may be re-melted by operation of the burner 45.

As noted, the side well 10 is compact in design and therefore occupies only a small section of the furnace wall that is typically crowded with burners, pipes and other equipment. The shaft 44, 44' of the impeller 40, 40' can be operated via belts/pulleys or drive shafts from a motor or other apparatus positioned some distance away from the furnace where the apparatus is less likely to take up crowded floor space and is isolated from furnace heat.

Figure 12:
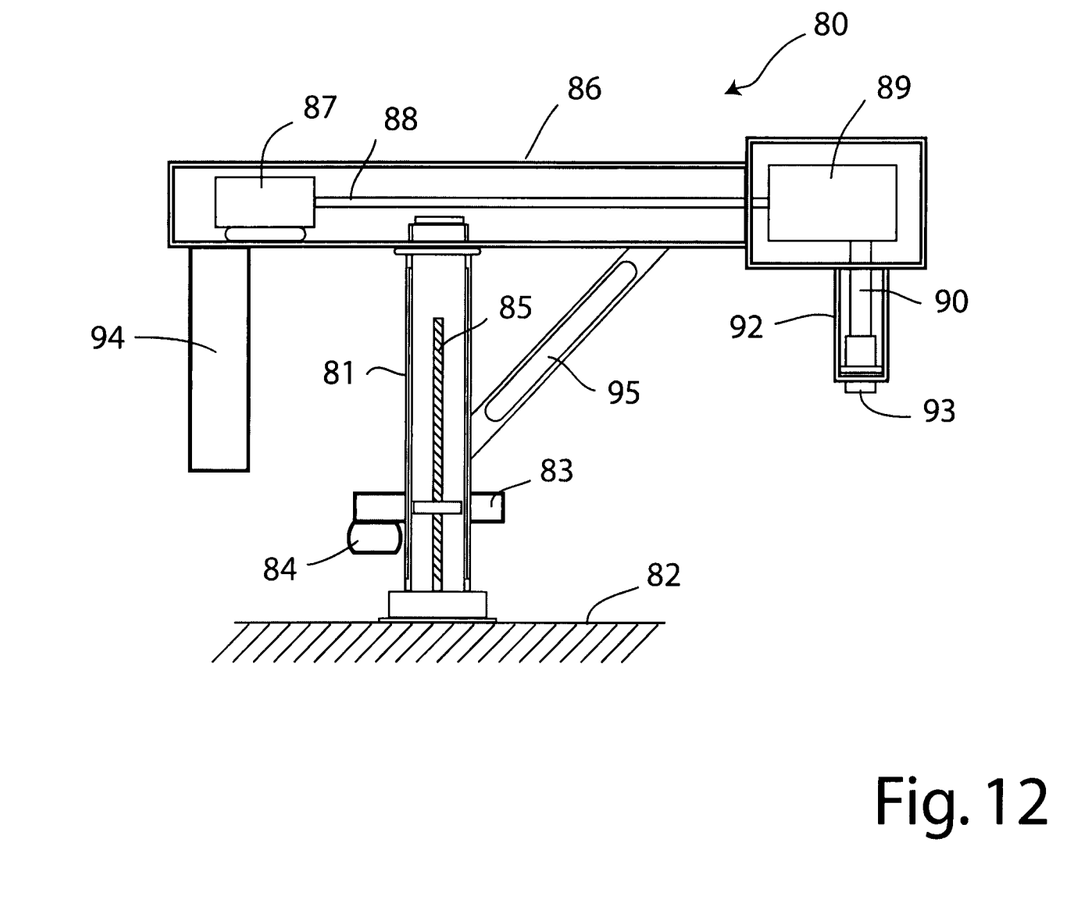
FIG. 12 is a side elevation, partly in cross-section, of a drive apparatus for driving an impeller of the kind previously shown.
Figure 13:
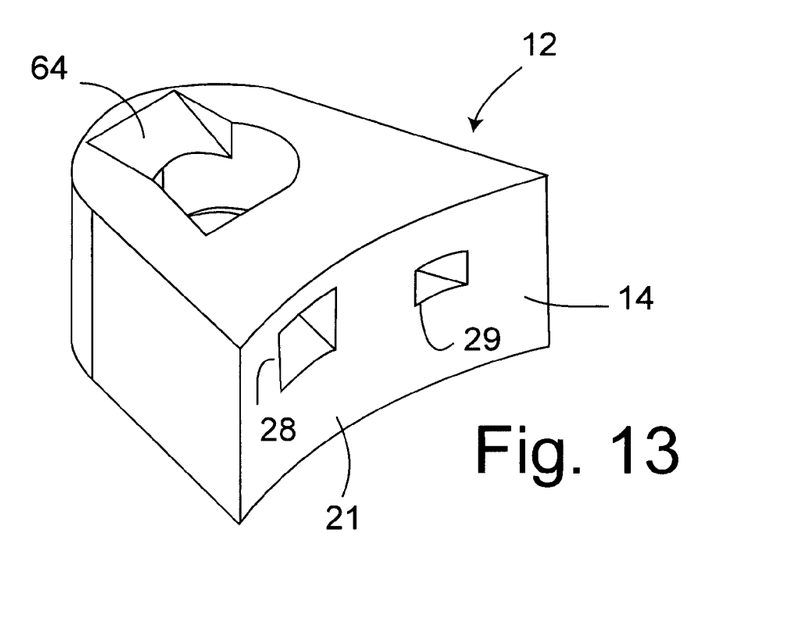
FIG. 13 is a perspective view of a side well body (showing only the refractory material) for use in a side well of a second exemplary embodiment.
Figure 14:
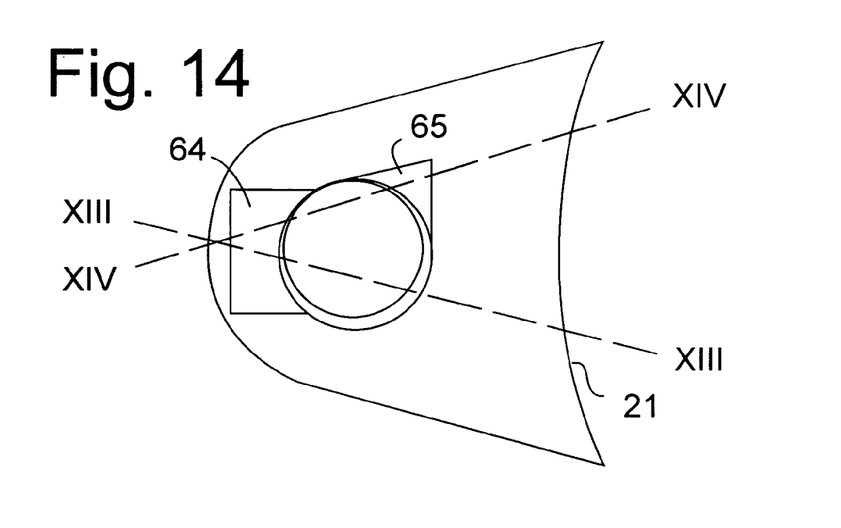
FIG. 14 is a top plan view of the body of the body of FIG. 13.

An example of such drive apparatus 80 for the impeller is shown in FIG. 12. This shows a vertical telescopic post 81 mounted on a floor 82. The post has an encircling gear arrangement 83 that telescopes an upper part of the post upwardly or downwardly on a lower part as desired by operation of an electric motor 84 that drives the gear arrangement 83 around an internal threaded vertical rod 85. This allows the upper parts of the drive apparatus 80 to be raised and lowered as required. A horizontal cross beam 86 is supported by the upper end of the vertical post 81 and encloses an electric motor 87 at one end that rotates a horizontal drive rod 88. At the other end of the beam 86, a gear box 89 converts the horizontal rotation of drive rod 88 into vertical rotation of a vertical drive rod 90 that rotates in bearings 91 situated at the lower end of a housing 92. The lower end 93 of drive rod 90 extends out of the lower end of the housing and includes an internal coupling allowing the rod 90 to be coupled with the upper end of an impeller 40 (not shown in this drawing) such that rotation of the drive rod 90 causes rotation of the impeller about its vertical axis. The cross beam 86 is provided with a counterweight 94 at the end opposite to the housing 92 to balance the beam. A strut 95 stiffens the cross beam 86 and provides stability. Such an arrangement may be positioned behind a side well of the kind previously illustrated to provide rotational drive for the impeller. The drive apparatus 80 does not have to be positioned close to the furnace wall and therefore can be positioned away from the cluttered and hot area immediately adjacent to the furnace wall. Accordingly, only the side well 10 itself has to occupy valuable floor area around a furnace and the side well is of a compact design that takes up a minimum of such space.

Figure 15:
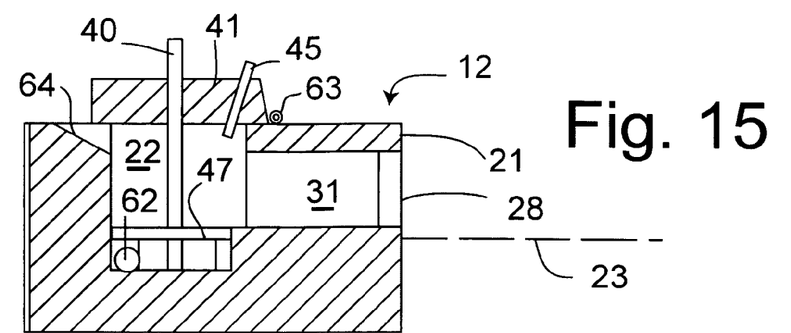
FIG. 15 is a vertical cross-section along line XIII-XIII of FIG. 14, but showing additional equipment including an impeller.

In the above side well embodiment, as can best be seen from FIG. 6, the bottom of the impeller region 25 is positioned above the level of the furnace floor 49 to allow self-draining as indicated above. However, it is sometimes advantageous to position the bottom of the impeller region below the level of the furnace floor. This allows the profile of the side well to be reduced in height and allows the metal inlet 28 and metal outlet 29 to be positioned lower in the front face 14 to accommodate shallower metal depths within the furnace. An alternative embodiment having such features is shown in FIGS. 13 to 18 (note that, for simplicity, FIGS. 13, 14 and 16 to 18 show the body only of the side well, but the additional equipment is shown in FIG. 15).

Figure 16:
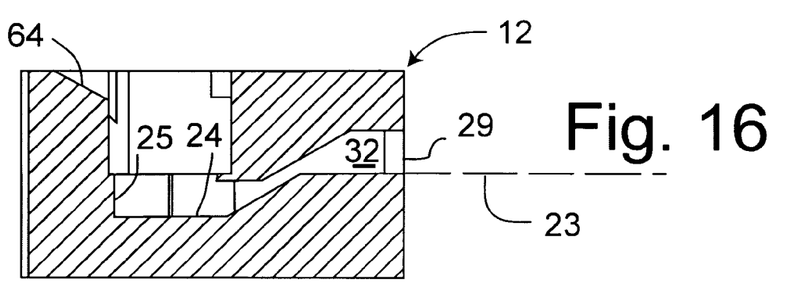
FIG. 16 is a vertical cross-section along line XIV-XIV of FIG. 14.
Figure 17:
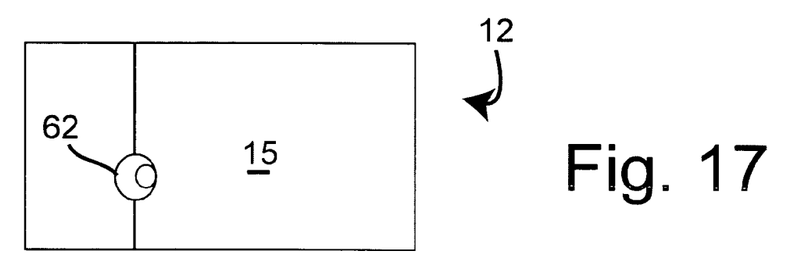
FIG. 17 is a side elevation view of the body of FIG. 13 taken from the right hand side of FIG. 13.
Figure 18:
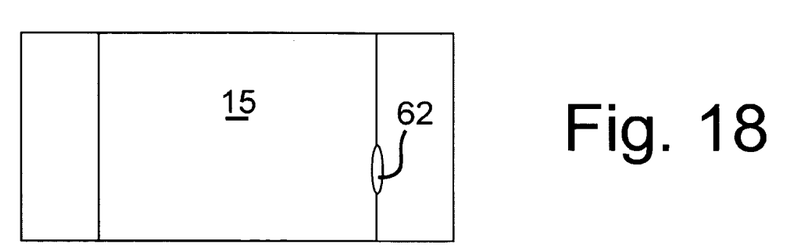
FIG. 18 is a rear elevation of the body of FIG. 13.

As can be seen best from the cross sectional views of FIGS. 15 and 16, in this embodiment, the bottom 24 of the impeller region 25 in the cavity 22 is positioned below the level 23 of the floor of the main furnace chamber. The metal inlet aperture 28 in the front surface 21 of the body 12 is positioned slightly above the level 23 of the furnace floor and connects to channel 31 that extends horizontally to the cavity 22 above the vaned section 47 of the impeller (as in the previous embodiment). The metal outlet aperture 29 is positioned so that its lower edge is exactly at the level 23 of the furnace floor, i.e. the outlet is flush with the furnace floor. The channel 32 that leads from the impeller region 25 to the metal outlet 29 rises along its length as shown in FIG. 16 to accommodate the difference in the level between the outlet from the cavity 22 and that of the metal outlet aperture 29 itself. Consequently, the metal inlet aperture 28 and metal outlet aperture 29 do not differ greatly in vertical height and can therefore work properly when the metal depth in the furnace chamber is quite shallow. However, in this embodiment, when the furnace is emptied of molten metal, the well 25 does not drain into the furnace chamber because it is positioned at a lower level than the furnace floor. Therefore, a drain 62 for the cavity 22 is provided at the bottom of the cavity leading to the side surface 15 of the side well body 12. The drain is normally closed by a ceramic-coated plug (not shown) that can be removed for draining purposes. Alternatively, the metal may be left to solidify in the cavity 22 and then re-melted when desired (i.e. when the furnace is to be refilled) e.g. by operation of the burner 45.

Preferably, the level of the bottom 24 of the cavity may vary from slightly below the level 23 of the furnace floor to up to 30 inches (76 cm) below the level 23. More preferably, the bottom 24 is from about 4 to 10 inches (10 cm to 25 cm) below the level 23 of the furnace floor.

In this embodiment (FIG. 15), the cover 41 is shown attached to the body 12 by means of a hinge 63 to facilitate opening of the cover for loading metal into the side well. The body is also provided with a sloping cutout 64 adjacent to the opening of the cavity to form a chute to facilitate introduction of molten metal into the cavity 22. The cutout also facilitates the collection or skimming of debris without requiring the cover to be removed.

A smaller cutout 65 (see FIG. 14) for the addition of small form alloy or metal feed additions is also provided.

What I claim is:

1. A side well for a metal melting furnace, comprising:
an insulated body having a front wall adapted to form part of an insulated side wall of a metal melting furnace and a top, a cavity within said body including a single upright impeller region having a cylindrical wall adjacent to a closed bottom of the cavity, an entrance to said cavity at the top of said insulated body, a metal inlet channel leading directly into said cavity from an inlet aperture in said front wall, and a metal outlet channel leading directly from said cavity to a metal outlet aperture in said front wall; and
a rotatable impeller having a vertical rotatable shaft and at least one vaned section positioned at a lower end of the rotatable shaft, wherein said vaned section has an outer periphery spaced from said cylindrical wall of the impeller region by a distance in a range of 0.1 to 10% of a diameter of the vaned section;
wherein said impeller extends into said cavity with said vaned section positioned in said impeller region adjacent to said cylindrical wall.

2. A side well according to claim 1, wherein said outer periphery of the vaned section is spaced from said cylindrical wall of the impeller region by a distance that is in a range of 1.5 to 4% of said diameter of the vaned section.

3. A side well according to claim 1, wherein a ratio of cross-sectional area of said inlet aperture to said outlet aperture is in a range of 1:1 to 10:1.

4. A side well according to claim 1, wherein a ratio of cross-sectional area of said inlet aperture to said outlet aperture is in a range of 2:1 to 3:1.

5. A side well according to claim 1, wherein said vaned section comprises a horizontal disk having a central opening and at least one vane extending from said shaft beneath said disk.

6. A side well according to claim 1, wherein said metal outlet channel rises in said body between said closed bottom of said cavity and said metal outlet aperture.

7. A side well according to claim 1, wherein said metal inlet channel and said metal outlet channel extend horizontally from end to end.

8. A side well for a metal melting furnace, comprising:
an insulated body having a front wall adapted to form part of an insulated side wall of a metal melting furnace and a top, a cavity within said body including a single upright impeller region having a cylindrical wall adjacent to a closed bottom of the cavity, an entrance to said cavity at the top of said insulated body, a metal inlet channel leading directly into said cavity from an inlet aperture in said front wall, and a metal outlet channel leading directly from said cavity to a metal outlet aperture in said front wall;
a rotatable impeller having a vertical rotatable shaft and at least one vaned section positioned at a lower end of the rotatable shaft; and
a heater operable for heating metal present in said cavity;
wherein said impeller extends into said cavity with said vaned section positioned in said impeller region adjacent to said cylindrical wall.

9. A side well for a metal melting furnace, comprising:
an insulated body having a front wall adapted to form part of an insulated side wall of a metal melting furnace and a top, a cavity within said body including a single upright impeller region having a cylindrical wall adjacent to a closed bottom of the cavity, an entrance to said cavity at the top of said insulated body, a metal inlet channel leading directly into said cavity from an inlet aperture in said front wall, and a metal outlet channel leading directly from said cavity to a metal outlet aperture in said front wall;
a rotatable impeller having a vertical rotatable shaft and at least one vaned section positioned at a lower end of the rotatable shaft; and
a closable drain outlet from said cavity adjacent to said bottom end;
wherein said impeller extends into said cavity with said vaned section positioned in said impeller region adjacent to said cylindrical wall.

10. An insulated body for a side well for a metal melting furnace, said insulated body having a front wall adapted to form part of an insulated side wall of a metal melting furnace and a top, a cavity within said body having a cylindrical wall adjacent to a closed bottom of the cavity for receiving a vaned section of an impeller, an entrance to said cavity at the top of said insulated body, a metal inlet channel leading directly into said cavity from an inlet aperture in said front wall, and a metal outlet channel leading directly from said cavity to a metal outlet aperture in said front wall, and wherein said inlet aperture in said front wall is positioned higher in said front wall than said outlet aperture.

11. An insulated body according to claim 10, wherein a ratio of cross-sectional area of said inlet aperture to said outlet aperture is in a range of 1:1 to 10:1.

12. An insulated body according to claim 10, wherein a ratio of cross-sectional area of said inlet aperture to said outlet aperture is in a range of 2:1 to 3:1.

13. An insulated body according to claim 10, wherein said metal outlet channel rises in said body between said closed bottom of said cavity and said metal outlet aperture.

14. An insulated body according to claim 10, wherein said metal inlet channel and said metal outlet channel extend horizontally from end to end.

15. An insulated body for a side well for a metal melting furnace, said insulated body having a front wall adapted to form part of an insulated side wall of a metal melting furnace and a top, a cavity within said body having a cylindrical wall adjacent to a closed bottom of the cavity for receiving a vaned section of an impeller, an entrance to said cavity at the top of said insulated body, a metal inlet channel leading directly into said cavity from an inlet aperture in said front wall, a metal outlet channel leading directly from said cavity to a metal outlet aperture in said front wall, wherein said metal inlet channel and said metal outlet channel extend horizontally from end to end, and a closable drain outlet from said cavity adjacent to said bottom end.

16. A metal melting furnace provided with a side well according to claim 1.

17. A furnace according to claim 16, wherein said furnace is a direct charge reverberatory metal melting furnace.

18. A side well for a metal melting furnace, comprising:
an insulated body having a front wall adapted to form part of an insulated side wall of a metal melting furnace and a top, a cavity within said body including a single upright impeller region having a cylindrical wall adjacent to a closed bottom of the cavity, an entrance to said cavity at the top of said insulated body, a metal inlet channel leading directly into said cavity from an inlet aperture in said front wall, and a metal outlet channel leading directly from said cavity to a metal outlet aperture in said front wall; and
a rotatable impeller having a vertical rotatable shaft and at least one vaned section positioned at a lower end of the rotatable shaft;
wherein said impeller extends into said cavity with said vaned section positioned in said impeller region adjacent to said cylindrical wall; and wherein
said inlet aperture in said front wall is positioned higher in said front wall than said outlet aperture.

19. A side well for a metal melting furnace, comprising:
an insulated body having a front wall adapted to form part of an insulated side wall of a metal melting furnace and a top, a cavity within said body including a single upright impeller region having a cylindrical wall adjacent to a closed bottom of the cavity, an entrance to said cavity at the top of said insulated body, a metal inlet channel leading directly into said cavity from an inlet aperture in said front wall, and a metal outlet channel leading directly from said cavity to a metal outlet aperture in said front wall; and
a rotatable impeller having a vertical rotatable shaft and at least one vaned section positioned at a lower end of the rotatable shaft;
wherein said impeller extends into said cavity with said vaned section positioned in said impeller region adjacent to said cylindrical wall; and wherein
said metal inlet channel and said metal outlet channel are angled away from each other by an angle of at least 22.5°.

20. An insulated body for a side well for a metal melting furnace, said insulated body having a front wall adapted to form part of an insulated side wall of a metal melting furnace and a top, a cavity within said body having a cylindrical wall adjacent to a closed bottom of the cavity for receiving a varied section of an impeller, an entrance to said cavity at the top of said insulated body, a metal inlet channel leading directly into said cavity from an inlet aperture in said front wall, and a metal outlet channel leading directly from said cavity to a metal outlet aperture in said front wall, and wherein said metal inlet channel and said metal outlet channel are angled away from each other by an angle of at least 22.5°.

* * * * *